(12) United States Patent
Forster et al.

(10) Patent No.: US 10,977,969 B2
(45) Date of Patent: Apr. 13, 2021

(54) RFID/NFC PANEL AND/OR ARRAY USED IN SMART SIGNAGE APPLICATIONS AND METHOD OF USING

(75) Inventors: Ian J. Forster, Essex (GB); David A. Welch, Somerset (GB); Haochuan Wang, S. Pasadena, CA (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 265 days.

(21) Appl. No.: 13/014,866

(22) Filed: Jan. 27, 2011

(65) Prior Publication Data

US 2011/0185607 A1    Aug. 4, 2011

Related U.S. Application Data

(60) Provisional application No. 61/311,473, filed on Mar. 8, 2010, provisional application No. 61/299,609, filed on Jan. 29, 2010.

(51) Int. Cl.
| | |
|---|---|
| *G06Q 30/02* | (2012.01) |
| *G09F 27/00* | (2006.01) |
| *G09F 13/04* | (2006.01) |
| *G09F 15/02* | (2006.01) |
| *G09F 13/00* | (2006.01) |

(52) U.S. Cl.
CPC ............ *G09F 27/00* (2013.01); *G09F 13/005* (2013.01); *G09F 13/04* (2013.01); *G09F 15/02* (2013.01); *G06Q 30/0251* (2013.01); *G06Q 30/0259* (2013.01); *G06Q 30/0267* (2013.01)

(58) Field of Classification Search
CPC .......... G06Q 30/0201; G06Q 30/0202; G06Q 30/0203; G06Q 30/0204; G06Q 30/0205; G06Q 30/0279; G06Q 30/0281; G06Q 30/0282
See application file for complete search history.

(56) References Cited

U.S. PATENT DOCUMENTS

| | | |
|---|---|---|
| 1,331,136 A | 2/1920 | Woodjard |
| 5,083,111 A | 1/1992 | Drucker et al. |
| 5,485,291 A | 1/1996 | Qiao |
| 5,609,059 A | 3/1997 | McEwan |
| 5,641,219 A | 6/1997 | Mizobe |
| 5,648,613 A | 7/1997 | Kiefer |

(Continued)

FOREIGN PATENT DOCUMENTS

| | | |
|---|---|---|
| BR | PI0611910 | 2/2011 |
| CN | 1741862 | 3/2006 |

(Continued)

OTHER PUBLICATIONS

Domdouzis et al., Radio Frequency Identification (RFID) applications: A brief introduction, 2007, Elsevier, Advanced Engineering Informatics vol. 21, pp. 351-355 (Year: 2007).*

(Continued)

*Primary Examiner* — Hajime Rojas
*Assistant Examiner* — Christopher C Busch (57) ABSTRACT

The present invention relates to an interactive advertising system and method of using the system. A plurality of removable RFID devices are disposed on a panel which is separate from an advertising graphic that is supported in an illuminated frame. Activation of one of the RFID devices illuminates a portion of the advertising graphic.

20 Claims, 5 Drawing Sheets

(56) References Cited

U.S. PATENT DOCUMENTS

| | | |
|---|---|---|
| 5,648,643 A | 7/1997 | Knowles et al. |
| 5,720,123 A | 2/1998 | Taylor |
| 5,841,350 A | 11/1998 | Appalucci et al. |
| 5,867,017 A | 2/1999 | Merwin et al. |
| 5,921,674 A | 7/1999 | Koczi |
| 5,944,405 A | 8/1999 | Takeuchi |
| 5,945,938 A | 8/1999 | Chia et al. |
| 5,947,578 A | 9/1999 | Ayres |
| 6,142,375 A | 11/2000 | Belka et al. |
| 6,144,264 A | 11/2000 | Wen |
| 6,246,778 B1 | 6/2001 | Moore |
| 6,744,367 B1 | 6/2004 | Forster |
| 6,771,256 B1 | 8/2004 | Abraham et al. |
| 6,786,626 B2 | 9/2004 | Wu |
| 6,838,989 B1 | 1/2005 | Mays et al. |
| 6,839,035 B1 | 1/2005 | Addonisio et al. |
| 6,851,999 B2 | 2/2005 | Fong |
| 6,965,205 B2 | 11/2005 | Piepgras et al. |
| 7,012,544 B2 | 3/2006 | Cunningham et al. |
| 7,046,160 B2 | 5/2006 | Pederson et al. |
| 7,064,498 B2 | 6/2006 | Dowling et al. |
| 7,084,769 B2 | 8/2006 | Bauer et al. |
| 7,086,587 B2 | 8/2006 | Myllymaki |
| 7,086,769 B1 | 8/2006 | Thompson et al. |
| 7,098,794 B2 | 8/2006 | Lindsay |
| 7,109,986 B2 | 9/2006 | Kerr et al. |
| 7,167,106 B2 | 1/2007 | Hasse |
| 7,202,838 B2 | 4/2007 | Kerr et al. |
| 7,304,577 B2 | 12/2007 | Waldner |
| 7,375,650 B2 | 5/2008 | Lo |
| 7,377,421 B2 | 5/2008 | Rhoads |
| 7,378,973 B2 | 5/2008 | Dixon |
| 7,477,152 B2 | 1/2009 | Forster |
| 7,490,054 B2 | 2/2009 | Reade et al. |
| 7,492,346 B2 | 2/2009 | Manabe |
| 7,495,576 B2 | 2/2009 | Maskeny et al. |
| 7,515,149 B2 | 4/2009 | Kerr et al. |
| 7,564,426 B2 | 7/2009 | Poor |
| 7,600,906 B2 | 10/2009 | Chon |
| 7,654,723 B2 | 2/2010 | Chang |
| 7,670,020 B2 | 3/2010 | Chang |
| 7,695,165 B2 | 4/2010 | Chang |
| 7,722,172 B2 | 5/2010 | Silverbrook |
| 7,722,241 B2 | 5/2010 | Chang |
| 7,737,858 B2 | 6/2010 | Matityaho |
| 7,750,810 B2 | 7/2010 | Ritter et al. |
| 7,752,790 B1 | 7/2010 | Michael et al. |
| 7,756,467 B2 | 7/2010 | Bent et al. |
| 7,810,983 B2 | 10/2010 | Chang |
| 7,817,045 B2 | 10/2010 | Onderko |
| 7,845,823 B2 | 12/2010 | Mueller |
| 7,850,341 B2 | 12/2010 | Mrakovich |
| 7,868,778 B2 | 1/2011 | Kenwright |
| 7,876,101 B2 | 1/2011 | Lee |
| 7,903,103 B2 | 3/2011 | Osterberg et al. |
| 7,920,050 B2 | 4/2011 | Juels |
| 7,959,326 B2 | 6/2011 | Laporte |
| 7,961,097 B2 | 6/2011 | Porte et al. |
| 7,979,026 B2 | 7/2011 | Hulvey |
| 8,014,722 B2 | 9/2011 | Abel et al. |
| 8,018,345 B2 | 9/2011 | Xiang |
| 8,068,011 B1 | 11/2011 | Sajadi et al. |
| 8,102,797 B2 | 1/2012 | Abel |
| 8,112,066 B2 | 2/2012 | Ayed |
| 8,117,445 B2 | 2/2012 | Werner et al. |
| 8,126,505 B2 | 2/2012 | Tulloch |
| 8,237,562 B1 | 8/2012 | Picasso et al. |
| 8,242,893 B1 | 8/2012 | Lin |
| 8,249,935 B1 | 8/2012 | DiMartino et al. |
| 8,321,922 B1 | 11/2012 | Lo et al. |
| 8,326,991 B2 | 12/2012 | Diaz et al. |
| 8,332,272 B2 | 12/2012 | Fisher |
| 8,469,269 B2 | 6/2013 | Daily et al. |
| 8,474,700 B1 | 7/2013 | Lewis et al. |
| 8,520,695 B1 | 8/2013 | Rubin et al. |
| 8,638,228 B2 | 1/2014 | Amigo et al. |
| 8,655,286 B2 | 2/2014 | Mendolia |
| 8,750,514 B2 | 6/2014 | Gallo et al. |
| 8,842,102 B2 | 9/2014 | Forster et al. |
| 8,880,055 B1 | 11/2014 | Clement et al. |
| 8,937,531 B2 | 1/2015 | Rimai et al. |
| 8,961,306 B2 | 2/2015 | LeMay et al. |
| 9,024,763 B2 | 5/2015 | Hamedani |
| 9,108,434 B2 | 8/2015 | Tsirline et al. |
| 9,124,442 B2 | 9/2015 | McCormack et al. |
| 9,698,872 B2 | 7/2017 | Havernin et al. |
| 9,767,329 B2 | 9/2017 | Forster |
| 9,894,468 B2 | 2/2018 | Brown et al. |
| 10,402,598 B2 | 9/2019 | Forster |
| 10,540,527 B2 | 1/2020 | Forster |
| 2002/0030992 A1 | 3/2002 | Lefebvre |
| 2002/0036622 A1 | 3/2002 | Jaeger et al. |
| 2002/0154633 A1 | 10/2002 | Shin et al. |
| 2002/0159246 A1 | 10/2002 | Murasko et al. |
| 2002/0186133 A1 | 12/2002 | Loof |
| 2002/0190845 A1 | 12/2002 | Moore |
| 2003/0029918 A1 | 2/2003 | Leanheart et al. |
| 2003/0034985 A1 | 2/2003 | Needham Riddle |
| 2003/0115096 A1* | 6/2003 | Reynolds ............... G06Q 30/02 705/14.58 |
| 2004/0012486 A1 | 1/2004 | Mani |
| 2004/0183742 A1 | 9/2004 | Goff et al. |
| 2004/0220860 A1 | 11/2004 | Persky et al. |
| 2005/0017071 A1 | 1/2005 | Noonan |
| 2005/0186902 A1 | 8/2005 | Lieffort et al. |
| 2005/0207823 A1 | 9/2005 | Adams et al. |
| 2005/0280631 A1 | 12/2005 | Wong et al. |
| 2006/0028822 A1 | 2/2006 | Tanamachi |
| 2006/0032926 A1 | 2/2006 | Baba et al. |
| 2006/0066453 A1 | 3/2006 | Homanfar et al. |
| 2006/0071778 A1 | 4/2006 | Vesikivi et al. |
| 2006/0080819 A1 | 4/2006 | Mcallister |
| 2006/0090384 A1 | 5/2006 | Woodruff |
| 2006/0160488 A1 | 7/2006 | Sueoka et al. |
| 2006/0214794 A1 | 9/2006 | Wang |
| 2006/0215958 A1 | 9/2006 | Yeo |
| 2006/0230276 A1 | 10/2006 | Nochta |
| 2006/0261938 A1* | 11/2006 | Lai ....................... G06K 7/0008 340/505 |
| 2006/0261950 A1 | 11/2006 | Arneson et al. |
| 2006/0266824 A1 | 11/2006 | Hassenbuerger |
| 2006/0273176 A1 | 12/2006 | Audebert et al. |
| 2006/0287964 A1 | 12/2006 | Brown |
| 2006/0290501 A1 | 12/2006 | Hammad et al. |
| 2006/0293956 A1 | 12/2006 | Walker et al. |
| 2007/0008140 A1 | 1/2007 | Saarisalo et al. |
| 2007/0013479 A1 | 1/2007 | Goel et al. |
| 2007/0022294 A1 | 1/2007 | Lapstun et al. |
| 2007/0029384 A1 | 2/2007 | Atherton |
| 2007/0029939 A1 | 2/2007 | Burkum et al. |
| 2007/0056871 A1 | 3/2007 | Griffiths |
| 2007/0057791 A1 | 3/2007 | Karjoth et al. |
| 2007/0075145 A1 | 4/2007 | Arendonk et al. |
| 2007/0090954 A1 | 4/2007 | Mahaffey |
| 2007/0120772 A1 | 5/2007 | Kim et al. |
| 2007/0135112 A1 | 6/2007 | Lessing |
| 2007/0145152 A1 | 6/2007 | Jogand-Coulomb et al. |
| 2007/0188483 A1 | 8/2007 | Bonner |
| 2007/0194879 A1 | 8/2007 | Backes et al. |
| 2007/0215685 A1 | 9/2007 | Self et al. |
| 2007/0229250 A1 | 10/2007 | Recker |
| 2007/0027395 A1 | 11/2007 | Ribi |
| 2007/0273951 A1* | 11/2007 | Ribi ..................... B42D 15/022 359/237 |
| 2007/0274242 A1 | 11/2007 | Lamacraft et al. |
| 2008/0022160 A1 | 1/2008 | Chakraborty |
| 2008/0040845 A1 | 2/2008 | Shoshan |
| 2008/0064346 A1 | 3/2008 | Charrat |
| 2008/0079582 A1 | 4/2008 | Alexis et al. |
| 2008/0094854 A1 | 4/2008 | Coleman |
| 2008/0100443 A1 | 5/2008 | Grunwald et al. |
| 2008/0101400 A1 | 5/2008 | Auterinen |
| 2008/0117047 A1 | 5/2008 | Collins et al. |
| 2008/0132167 A1 | 6/2008 | Bent et al. |

(56) References Cited

U.S. PATENT DOCUMENTS

| | | |
|---|---|---|
| 2008/0132269 A1 | 6/2008 | Shen et al. |
| 2008/0136647 A1 | 6/2008 | Brown |
| 2008/0146148 A1 | 6/2008 | Hulvey |
| 2008/0150719 A1 | 6/2008 | Cote et al. |
| 2008/0162154 A1* | 7/2008 | Fein ............... G06Q 10/06 705/14.4 |
| 2008/0167000 A1 | 7/2008 | Wentker et al. |
| 2008/0183581 A1 | 7/2008 | Philippe Coppolani |
| 2008/0191878 A1 | 8/2008 | Abraham |
| 2008/0192932 A1 | 8/2008 | Graeber et al. |
| 2008/0219227 A1 | 9/2008 | Michaelis |
| 2008/0238610 A1 | 10/2008 | Rosenberg |
| 2008/0238706 A1 | 10/2008 | Kenwright |
| 2008/0248815 A1* | 10/2008 | Busch ............... H04W 4/029 455/456.5 |
| 2008/0251582 A1 | 10/2008 | Nguyen |
| 2008/0255960 A1 | 10/2008 | Nguyen |
| 2008/0258875 A1 | 10/2008 | Jesme et al. |
| 2008/0262928 A1 | 10/2008 | Michaelis |
| 2008/0276507 A1 | 11/2008 | Hines |
| 2008/0300985 A1 | 12/2008 | Shamp et al. |
| 2008/0309463 A1* | 12/2008 | Godzwon ............ G06K 7/0008 340/10.1 |
| 2009/0019755 A1 | 1/2009 | Moretti |
| 2009/0081943 A1 | 3/2009 | Dobyns et al. |
| 2009/0085746 A1 | 4/2009 | Ericikson et al. |
| 2009/0088077 A1 | 4/2009 | Brown et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0118006 A1 | 5/2009 | Kelly et al. |
| 2009/0146814 A1 | 6/2009 | Hammad et al. |
| 2009/0168441 A1 | 7/2009 | Lin |
| 2009/0174556 A1 | 7/2009 | Horne et al. |
| 2009/0189816 A1 | 7/2009 | Nikiti |
| 2009/0192937 A1 | 7/2009 | Griffin et al. |
| 2009/0193500 A1 | 7/2009 | Griffin |
| 2009/0197551 A1* | 8/2009 | Paraskake ............ H04B 1/086 455/179.1 |
| 2009/0212919 A1 | 8/2009 | Selgrath et al. |
| 2009/0221240 A1 | 9/2009 | Zhang |
| 2009/0257242 A1 | 10/2009 | Wendman |
| 2009/0258678 A1 | 10/2009 | Chava et al. |
| 2009/0267862 A1* | 10/2009 | Roesner ............... H01Q 1/2225 343/893 |
| 2009/0282859 A1 | 11/2009 | Glielmo et al. |
| 2009/0292816 A1 | 11/2009 | Etchegoyen |
| 2009/0297157 A1 | 12/2009 | Nakagawa |
| 2009/0315670 A1* | 12/2009 | Naressi ............... G06F 21/10 340/5.8 |
| 2010/0009627 A1 | 1/2010 | Huomo |
| 2010/0012715 A1 | 1/2010 | Williams et al. |
| 2010/0026464 A1 | 2/2010 | Graeber |
| 2010/0030636 A1 | 2/2010 | Vijayshankar et al. |
| 2010/0046198 A1 | 2/2010 | Hoffman |
| 2010/0066508 A1* | 3/2010 | Jokinen ............... H04L 51/14 340/10.5 |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082444 A1 | 4/2010 | Lin et al. |
| 2010/0082485 A1 | 4/2010 | Lin et al. |
| 2010/0085774 A1 | 4/2010 | Park |
| 2010/0107463 A1 | 5/2010 | Spiro |
| 2010/0123553 A1* | 5/2010 | Banerjee ............. H01Q 1/2208 340/10.1 |
| 2010/0141452 A1 | 6/2010 | Lian et al. |
| 2010/0148964 A1 | 6/2010 | Broer |
| 2010/0148965 A1 | 6/2010 | Alexis et al. |
| 2010/0161410 A1 | 6/2010 | Tulloch |
| 2010/0161434 A1 | 6/2010 | Herwig et al. |
| 2010/0172149 A1 | 7/2010 | Siemiet |
| 2010/0174599 A1 | 7/2010 | Rosenblatt et al. |
| 2010/0176971 A1 | 7/2010 | Banerjee et al. |
| 2010/0188842 A1* | 7/2010 | Yohananoff ................ 362/153.1 |
| 2010/0211431 A1 | 8/2010 | Lutnick et al. |
| 2010/0216396 A1 | 8/2010 | Fernandez et al. |
| 2010/0217709 A1 | 8/2010 | Aabye et al. |
| 2010/0221999 A1 | 9/2010 | Braun et al. |
| 2010/0231362 A1 | 9/2010 | Smith et al. |
| 2010/0241494 A1 | 9/2010 | Kumar et al. |
| 2010/0255865 A1 | 10/2010 | Karmarkar |
| 2010/0262449 A1 | 10/2010 | Monteforte et al. |
| 2010/0265041 A1 | 10/2010 | Almog et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau et al. |
| 2010/0306076 A1 | 12/2010 | Taveau |
| 2010/0306819 A1 | 12/2010 | Nahari et al. |
| 2010/0311326 A1 | 12/2010 | Klabunde et al. |
| 2011/0000971 A1 | 1/2011 | Onderko |
| 2011/0029777 A1 | 2/2011 | Murakami et al. |
| 2011/0047463 A1 | 2/2011 | Shepherd et al. |
| 2011/0047759 A1 | 3/2011 | Reiter |
| 2011/0065383 A1 | 3/2011 | Frankland et al. |
| 2011/0084814 A1 | 4/2011 | Ramsch |
| 2011/0112918 A1 | 5/2011 | Mestre et al. |
| 2011/0112920 A1 | 5/2011 | Mestre et al. |
| 2011/0114735 A1* | 5/2011 | Ziai .................. G06K 19/07786 235/492 |
| 2011/0121488 A1 | 5/2011 | Duffy |
| 2011/0149079 A1 | 6/2011 | Anderson |
| 2011/0149596 A1 | 6/2011 | Lv et al. |
| 2011/0156640 A1 | 6/2011 | Moshfeghi |
| 2011/0165859 A1 | 7/2011 | Wengrovitz |
| 2011/0185607 A1 | 8/2011 | Forster et al. |
| 2011/0187558 A1 | 8/2011 | Serex |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0244799 A1 | 10/2011 | Roberts et al. |
| 2011/0258443 A1 | 10/2011 | Barry |
| 2011/0276961 A1 | 11/2011 | Johansson et al. |
| 2011/0285511 A1 | 11/2011 | Maguire et al. |
| 2011/0287718 A1 | 11/2011 | Abel |
| 2011/0295108 A1 | 12/2011 | Cox et al. |
| 2011/0307309 A1 | 12/2011 | Forster et al. |
| 2011/0320291 A1 | 12/2011 | Coon |
| 2011/0320314 A1 | 12/2011 | Brown |
| 2011/0320345 A1 | 12/2011 | Taveau et al. |
| 2012/0001725 A1 | 1/2012 | Chen |
| 2012/0011572 A1 | 1/2012 | Chew et al. |
| 2012/0013448 A1 | 1/2012 | Baranowski |
| 2012/0024951 A1 | 2/2012 | Graeber |
| 2012/0029990 A1 | 2/2012 | Fisher |
| 2012/0032632 A1 | 2/2012 | Soar |
| 2012/0039472 A1 | 2/2012 | Liu et al. |
| 2012/0055998 A1 | 3/2012 | Mieslinger |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1 | 4/2012 | Marcu et al. |
| 2012/0089845 A1 | 4/2012 | Raleigh |
| 2012/0126700 A1 | 5/2012 | Mayfield et al. |
| 2012/0135839 A1 | 5/2012 | Watanabe et al. |
| 2012/0015633 A1 | 6/2012 | Rodriguez |
| 2012/0154633 A1 | 6/2012 | Rodriguez |
| 2012/0156992 A1 | 6/2012 | Walker et al. |
| 2012/0218084 A1 | 8/2012 | Arponen et al. |
| 2012/0253646 A1 | 10/2012 | Reghunath |

(56) References Cited

U.S. PATENT DOCUMENTS

| | | |
|---|---|---|
| 2012/0253974 A1 | 10/2012 | Haikonen et al. |
| 2012/0256494 A1 | 10/2012 | Kesler et al. |
| 2012/0265596 A1 | 10/2012 | Mazed et al. |
| 2012/0265682 A1 | 10/2012 | Menon |
| 2012/0278676 A1 | 11/2012 | Teraura |
| 2012/0297204 A1 | 11/2012 | Buer |
| 2012/0309302 A1 | 12/2012 | Buhot |
| 2012/0315839 A1 | 12/2012 | Mumcuoglu et al. |
| 2013/0006847 A1 | 1/2013 | Hammad et al. |
| 2013/0045679 A1 | 2/2013 | Orsatti et al. |
| 2013/0063008 A1 | 3/2013 | Martin |
| 2013/0065523 A1 | 3/2013 | Yun et al. |
| 2013/0106576 A1 | 5/2013 | Hinman et al. |
| 2013/0157713 A1 | 6/2013 | Stolarczyk |
| 2013/0165041 A1 | 6/2013 | Bukovjan et al. |
| 2013/0173455 A1 | 7/2013 | Adams et al. |
| 2013/0176184 A1 | 7/2013 | Dokai et al. |
| 2013/0309965 A1 | 11/2013 | Hillan |
| 2013/0342323 A1 | 12/2013 | Hinman et al. |
| 2013/0344805 A1 | 12/2013 | Lefley |
| 2014/0009268 A1 | 1/2014 | Oshima et al. |
| 2014/0070850 A1 | 3/2014 | Darwhekar et al. |
| 2014/0113551 A1 | 4/2014 | Krishnan et al. |
| 2014/0139347 A1 | 5/2014 | Forster |
| 2014/0145823 A1 | 5/2014 | Aase |
| 2014/0152856 A1 | 6/2014 | Ikeda et al. |
| 2014/0227970 A1 | 8/2014 | Brockenbrough et al. |
| 2014/0229251 A1 | 8/2014 | Lim et al. |
| 2014/0252083 A1 | 9/2014 | Lee et al. |
| 2014/0370803 A1 | 12/2014 | Haverinen et al. |
| 2015/0140929 A1 | 5/2015 | Lefley |
| 2015/0334521 A1 | 11/2015 | Lee |
| 2016/0283759 A1 | 9/2016 | Forster |
| 2017/0012355 A1 | 1/2017 | Pachler et al. |
| 2017/0302335 A1 | 10/2017 | Sawata et al. |
| 2017/0344765 A1 | 11/2017 | Forster |
| 2018/0049029 A1 | 2/2018 | Kumar et al. |
| 2019/0384948 A1 | 12/2019 | Forster |
| 2020/0151402 A1 | 5/2020 | Forster |

FOREIGN PATENT DOCUMENTS

| | | |
|---|---|---|
| CN | 101233753 | 7/2008 |
| CN | 101253750 | 8/2008 |
| CN | 201302803 Y | 9/2009 |
| CN | 102217410 | 10/2011 |
| CN | 102638446 | 8/2012 |
| EP | 0677887 | 10/1995 |
| EP | 1127469 | 8/2001 |
| EP | 1912437 | 4/2008 |
| EP | 1914631 | 4/2008 |
| EP | 2143991 | 1/2010 |
| EP | 1948995 | 4/2010 |
| EP | 2174457 | 4/2010 |
| EP | 1792272 | 10/2010 |
| EP | 2237519 | 10/2010 |
| EP | 2296025 | 3/2011 |
| EP | 2309431 | 4/2011 |
| EP | 2366937 | 9/2011 |
| EP | 2371110 | 10/2011 |
| FR | 2783960 | 3/2000 |
| JP | 2002162918 | 6/2002 |
| JP | 2006011422 | 1/2006 |
| JP | 2006-030882 | 2/2006 |
| JP | 2006030883 | 2/2006 |
| JP | 2006058435 | 3/2006 |
| JP | 2006349887 | 12/2006 |
| JP | 2007034362 | 2/2007 |
| JP | 2007114924 | 5/2007 |
| KR | 20100072115 | 10/2017 |
| WO | WO2006031824 | 3/2006 |
| WO | WO2006095212 | 9/2006 |
| WO | WO2006098765 | 9/2006 |
| WO | WO2006111782 | 10/2006 |
| WO | WO2006111797 | 10/2006 |
| WO | WO2007002459 | 1/2007 |
| WO | WO2007035835 | 3/2007 |
| WO | WO2007064069 | 6/2007 |
| WO | WO2008034937 | 3/2008 |
| WO | WO2008063706 | 5/2008 |
| WO | WO2008087431 | 7/2008 |
| WO | WO2008132269 | 11/2008 |
| WO | WO2008142455 | 11/2008 |
| WO | WO2009028203 | 3/2009 |
| WO | WO2010077194 | 7/2010 |
| WO | WO2010095988 | 8/2010 |
| WO | WO2010148816 | 12/2010 |
| WO | WO2011010970 | 1/2011 |
| WO | WO2011020041 | 2/2011 |
| WO | WO2011033424 | 3/2011 |
| WO | WO2011053914 | 5/2011 |
| WO | WO2011088190 | 7/2011 |
| WO | WO2011109092 | 9/2011 |
| WO | WO2011112778 | 9/2011 |
| WO | WO2011121488 | 10/2011 |
| WO | WO2012037255 | 3/2012 |

OTHER PUBLICATIONS

Australia: Examination Report dated Jun. 13, 2017; Application No. 2016202079; 3 pages.

"AN1445: Antenna design guide for MFRC52x, PN51x and PN53x, Rev. 1.2, Document AN1445_12", NXP B.V., (Oct. 11, 2010), 65 pgs.

"Radio-Frequency-Identific@tion, http://rfid-handbook.com", advertisement (Dec. 2, 2011), 5pgs., RFID-Handbook 3rd edition, Wiley and Sons LTD, Kalus Finkenzeller.

"NFC Record Type Definition (RTD)", Technical Specification NFC Forum, RTD 1.0, NFCForum-TS-RTD_1.0, (Jul. 24, 2006), 20 pgs.

"Radio Frequency Identification (RFID): A Focus on Information Security and Privacy", OECD_Digital_Economy_Papers,_No._138, Jan._14,_2008,_11-81.

"South Korea Telecommunications Report Included BMI's Forecasts", Q2 2012, Business Monitor International Ltd., (Apr. 2012), 94 pgs.

A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.

A pervasive presentator—Simplifying the task of presenting, Lulea University of Technology; Viktor Lindgren, Mattias Lundberg, Elias Naslund, John Viklund.

A System of Secure Virtual Coupons Using NFC Technology, IEEE Computer Society, CompProceedings of the Fifth Annual IEEE International Conference on Pervasive Computing and Communications Workshops (PerComW'07); Manfred Aigner, Sandra Dominikus, Martin Feldhofer.

Alios Ferscha, Orientation sensing for gesture-based interaction with smart artifacts, 2005.

Amato-McCoy, Deena M., Crime stoppers: by focusing their loss prevention efforts on the entire enterprise, grocers are in a better position to combat internal and external theft. Grocery Headquarters, v77, n 11, p. 101 (3). Nov. 2011.

Anonymous, "Near-field communications will be standard technology for mobiles", Electronics Weekly, (Feb. 21, 2007), p. 8.

Antoniou, Zoe, "NFC-Based Mobile Middleware for Intuitive User Interaction With Security in Smart Homes", Proc. of the 5th IASTED International Conference on Communication Systems and Networks (CSN'06), Aug. 28-30, 2006, Palma De Mallorca, Spain, Track 543-038, 6pgs.

Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.

(56) References Cited

OTHER PUBLICATIONS

Bauer-Reich, et al. "Low-profile, high-permeability antennaless RFID tags for use on metal objects"Proceedings of the 2012 IEEE International Workshop on Antenna Technology (iWAT), (Mar. 5-7, 2012), 32-35.
Becher, Michael et al., "Mobile Security Catching Up? Revealing the Nuts and Bolts of the Security of Mobile Devices", 2011 IEEE Symposium on Security and Privacy, 96-11.
Bling: NFC Arrives in U.S., Sam Churchill, Oct. 27, 2010, http://www.dailywireless.org/2010/10/27/bling-nfc-arrives-in-u-s/.
Bovelli, S., "A Novel Antenna Design for Passive RFID Transponders on Metal Surfaces", Proceedings of the 36th European Microwave Conference, Manchester, UK (Sep. 2006) 580-582.
Broll, Gregor, et al., "Touch to Play—Exploring Touch-Based Mobile Interaction with Public Displays", 3rd International Workshop on Near Field Communication, Feb. 22, 2011, 15-20.
Cavoukian, A. "Mobile Near Field Communications (NFC)—Tap'n Go—Keep it Secure & Private", Information and Privacy Commissioner, Ontario, Canada/Privacy by Design (Nov. 2011), 22 pgs.
Chai, Qi, "Design and Analysis of Security Schemes for Low-cost RFID Systems", Doctor of Philosophy Thesis in Electrical and Computer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-4, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Christian Metzger et al: "Making Radio Frequency Indentificaiton Visible—A Watchdog Tag", Fifth Annual IEEE International Conference on pervasive computing and communications workshops, Mar. 19-23, 2007.
Christianson, B., et al. (eds), "Security Protocols", 13th International Workshop, Revised Selected Papers, Cambridge, UK, (Apr. 20-22, 2005), Lecture Notes in Computer Science 4631, Springer-Verlag, Berlin 354 pgs.
Close Contact: An Examination of the Future of Near Field Communications, International Journal of Management & Information Systems—First Quarter 2012 vol. 16, No. 1; Chris Rose Capella.
Cole, P.H., et al., Networked RFID Systems and Lightweight Cryptography: Raising Barriers to Product Counterfeiting, First Edition, Springer-Verlag, Berlin (2003) 350pgs.
Connecting the Mobile Phone with the Internet of Things—Benefits of EPC and NFC Compatibility; Thomas J.P. Wiechert, Florian Michahelles.
Coppolino, Luigi, et al., "A Trusted information Agent for Security Information and Event Management", ICONS 2012: The Seventh International Conference on Systems, 6-12.
Do you talk to each poster? Security and Privacy for Interactions with Web Service by means of Contact Free Tag Readings, Peter Schoo, Massimo Paolucci.
Dodson, B., et al. "Micro-Interactions with NFC-Enabled Mobile Phones", Proceedings of the Third International Conference on Mobile Phones, Proceedings of the Third International Conference on Mobile Computing, Applications, and Services (MobiCASE), Los Angeles, CA, Oct. 2011. Retrieved from the Internet: <URFL:http://mobisocial.stanform.edu/papers/mobicase11.pdf>, 20pgs.
Elliptic Curve Certificates and Signatures for NFC Signature Records, Reasearch in Motion, Certicom Research; Tony Rosati, Greg Zaverucha.
Enabling RFID in Retail, George Roussos, Birkbeck, University of London, IEEE Computer Society, Mar. 2006.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usabiliy Features of NFC, 2009; Beygo, Omer Kerem; Eraslan, Cihan.
Finkenzeller, K., "Known attacks on RFID systems, possible countermeasures and upcoming standardization activities", presentation slides, RFID-Systech, Bermen, Germany, Jun. 2009. Retrieved from the internet: <URL:http://rfid-handbook.de/downloads/finkenzeller_Systech-Bremen-2009_v1.0.pdf>, 31pgs.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.
Francis, Lishoy, et al., "Practical Relay Attack on Contactless Transactions by Using NFC Mobile Phones", In Cryptology ePrint Archive, Report 2011/618, Nov. 2011, 16pgs.
Gebhart, M, et al., "Design of 13.56 MHz Smartcard Stickers with Ferrite for Payment and Authentication", Proceedings of the 2011 3rd International Workshop on near Field Communication (NFC), Feb. 21-22, 2011. Retrieved from the Internet: <URL:https://online.tugraz.at/tug_online/voe_main2.getVollText?pDocumentNr=202812&pCurrPk=59398>, 6pgs.
Ghanname, Taoufik. How NFC can to speed Bluetooth transactions—today. Eetimes. Feb. 14, 2006. Rietieved at http://eetimes.com/General/PrintView/4012606.
Hancke, G.P., "Practical Eavesdipping and Skimming Attacks on high-Frequency RFID Tokens", Perprint version of article published in Journal of Computer Security vol. 19 Issue 2. (Jun. 2010). Retrieved from the Internet: <URL:http://www.rfidblog.org.uk/HanckeJoCSS specialRFIDJune2010.pdf>, 23 pgs.
Hancke, G.P., "Security of proximity identification systems", technical Report, No. 752, Unicersity of Cambridge Computer Laboratory, UK (Jul. 2009), 161 pgs.
Hancke, G.P., et al., "Security Challenges for User-Oriented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCL 2008, Proc. 10th international conference on Human computer interaction with mobile devices and services, 245-254.
Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4 (2008), 12 pgs.
Husni, EMIR, et al, "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 4, 2014 for International Application PCT/US12/053322 filed Aug. 31, 2012.
International Preliminary Report on Patentability and Written Opinion dated Mar. 10, 2015 for International Application PCT/US13/031136 filed Mar. 14, 2013.
International Preliminary Report on Patentability and Written Opinion dated May 19, 2015 for International Application PCT/US13/031131 filed Mar. 14, 2013.
International Search Report dated Aug. 20, 2013 for International Application PCT/US13/031131 filed Mar. 14, 2013.

(56) References Cited

OTHER PUBLICATIONS

International Search Report dated Aug. 6, 2013 for International Application PCT/US13/031448 filed Mar. 14, 2013.
International Search Report dated Aug. 3, 2011 for Internation Application PCT/US11/022680 filed Jan. 16, 2011.
International Search Report dated Mar. 11, 2011 for Internation Application PCT/US11/022687 filed Jan. 27, 2011.
International Search Report dated May 22, 2013 for International Application PCT/US13/031136 filed Mar. 14, 2013.
International Search Report dated Nov. 21, 2012 for International Application PCT/US12/053322 filed Aug. 31, 2012.
Johansson, B., "An Introduction to RFID—Information Security and Privacy Concerns", TDDC03 Projects, (Spring 2004), 14 pgs.
Jonathan W. Valvano, Embedded System, 2009, https://books.google.ca/books?id=_JFsCgAAQBAJ&q=smart+scan+in+box+using+electronic+instructions#v=onepage&q&f=false.
Juels, A., et al., "The Blocker Tag: Selective Blocking of RFID Tags for Consumer Privacy", Proceedings of ACC CCS'03, Washington, DC (Oct. 27-30, 2003), 9 pgs.
Jung, M, et al., "All-Printed and Roll-to-Roll Printable 13.56-MHz-Operated 1-bit RF Tag on Plastic Foils", IEEE transactions on electron Devices, (Feb. 19, 2010), 10 pgs.
Kazmi, Hammad Raza, "Security and Privacy Issues in Near Field Communication (NFC) Systems",Master Thesis, Royal Institute of Technology, Sweden, Apr. 2011, 59 pgs.
Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.
Kortvedt, H.S., "Securing near Field Communication", Thesis for Master of Science in Communication Technology, Norwegian University of Science and Technology, (Jun. 2009), 135 pgs.
Kuo, S., "A performance evaluation method for EMI sheet of metal mountable HR RFID tag", Measurement, 44 (2011), 946-953.
Kupusamy, K S et al "A Model for Remote Access and Protection of Smartphones JUsing Short Message Service", International]. Computer Science, Engineering and. Information Technology (IJCSEIT), vol. 2, No. 1, (Feb. 2012), 91-1 00.
LocaTag-An NFC-based system enhancing instant messaging tools with real-time user location; Kobler, Philip Koene, Helmut Kremar, Matthias Altmann, Jan Marco Leimeister.
Location-Triggered Code Execution-Dismissing Displays and Keypads for Mobile Interaction; W. Narzt and H. Schmitzberger.
Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.
Madlmayr, Gerald, et al., "NFC Devices: Security & Privacy", Proceedings of the 3rd International Conference on Availability, Reliability and Security, Barcelona, Spain, Mar. 7, 2008, 13 pgs.
Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.
Mitrokotsa, A., et al., "Classification of RFID Attacks", Proceedings of the 2nd International Workshop on RFID Technology—Concepts, Applications, Challenges (IWRT 2008), in conjuction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.
Mobile Personal Devices meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/MPD-SPD-2010/.
Mulliner, Collin, "Attacking NFC Mobile Phones", 25th Chaos Communication Congress, Berlin, Germany (Dec. 2008). Retrieved from the internet : <URL:http://www.mulliner.org/nfc/feed/collin_mulliner_25c3_attacking_nfc_phones.pdf>, 71pgs.
Mulliner, Collin, "Vulnerability Analysis and Attacks on NFC-enabled Mobile Phones", 2009 International Conference on Availability, Reliability and Security, Fukuoka, Japan, Mar. 16-19, 2009, 695-700.
Near Field Communication in Smartphones, Simon Burkard, Berlin Institute of Technology, Germany, 2012.
Near Field Communications Handbook, vol. 13 of Internet and Communications, 2009; Mohammad Ilyas, https://books.google.co.in/books?id=xVZMTU8SpQAC&I pg=PA25&ots=2A3z7a-b93&dq=NFC%20adhesive%20tags%20security%20code &Ir&pg=PA25#v=onepage&q&f=false, pp. 30-49, 2009.
Newport Digital Technologies to Implement Microsoft Licensing Agreement; Prepares to Launch First Ruggesized RFID Reader with Windows Mobile Operating System. Business Wire. Oct. 20, 2009.
NFC and Mobile Payments Today, Andre Filipe de Axevedo Figueiredo Cruz, Nov. 2011.
NFC Data Exchange Format (NDEF), Technical Specification, NDEF 1.0, Jul. 24, 2006.
NFC Forum Type Tags, White Paper V1.0, Apr. 1, 2009-Public.
NFC Mobile Parlor Games Enabling Direct Player to Player Interaction, 2011 Third International Workshop on Near Field Communication, Avinash Nandwani, Paul Coulton, Reuben Edwards.
NFC-Based Mobile Interactions with Direct-View Displays; Khoovirajsingh Seewoonauth, Enrico Rukzio, Robert Hardy, and Paul Holleis.
NFC-CAP Security Assessment, vol. 1.0—May 11, 2009; Diego A. Ortiz-Yepes.
Ongtang, Machiagar, et al. "Semantically Rich Application-Centric Security in Android", Security and Communication Networks, vol. 5, Issue 6, Jun. 2012, 658-673.
Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.
Oren, Y., "Attacks on RFID-Based Electronic Voting System", Cryptology ePrint Archive, Report 2009/442 (2009). Retrieved from the Internet<URL: http://eprint.iacr.org/2009/422.pdf>, 21 pgs.
Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen.
Programming Android; Zigurd Mednieks, Laird Domin, G. Blake Meike, Masumi Nakamura, O'Reilly Media, Inc., 2011, https://books.google.com/books/about/Programming_Android.html?id=QP7VvnhDOOsC.
QR Code Tech Info: MECARD Format, May 2, 2011.
QRFactory, Redirectable QR, http://dashboard.qrfactory.com/.
Rahnama, Behnam, et al., "Securing RFID-Based Authentication Systems Using ParseKey+", Proceedings of the 3rd International Conference on Security of Information and Networks,_Taganrog,_Russia, Sep. 7-11, 2010,_212-217.
RFID based applications in culture, media and creative industries, 2011 Third International Workshop on Near Field Communication, Eileen Kuehn, Jens Reinhardt, Stephan Bergemann, Prof. Dr. Juergen Sieck.
RFID Inventory Management System. Package Printing, v57 n2, pp. 34. Feb. 2010.
Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: http://www.rfidguardian.org/images/a/a9/Lisa.06.pdf>, 14 pgs.
Rieback, M.R., et al., "The Evolution of RFID Security", Pervasive Computing (Jan.-Mar. 2006), 62-69.
Roland, M., "Security Vulnerabilities of the NDEF Signature Record Type", Presentation from WIMA 2011—NFC Research Track, Monaco (Apr. 19, 2011). Retrieved from the Internet: <URL:http://www.wima.mc/dan/2011/CONF_PDF/TUESDAY/AM/ROLAND.pdf>, 14pgs.
Roland, Michael, et al., "Digital Signature Records for the NFC Data Exchange Format", Second International Workshop on Near Field Communication, Monaco, Apr. 20, 2010, 71-76.

(56) References Cited

OTHER PUBLICATIONS

Sabzevar, A.P., "Security in RFID Systems" Project report for GMU ECE 646 (2004). Retrieved from the Internet: <URL: http:teal.gmu.edu/courses/ECE646/project/reports_2004/SP-4_report.pdf>, 13pgs.
Sarma, S.E., et al., "RFID Systems and Security and Privacy Implications", CHES 2002, LNCS 2523, B.S. Kaliski Jr. et al. (Eds.) (2003), pp. 454-469, 2003.
Secure contactless mobile financial services with Near Field Communication, Adeola Oluwaseyi Poroye, Thesis submitted to Department of Computer Science, University of the Western Cape, Aug. 2011, 150 pages.
Simple NDEF Exchange Protocol, Technical Specification, NFC Forum SNEP 1.0, Aug. 31, 2011.
Situated Door Displays and how to interact with them, Barbara Schmid, Jan. 16, 2012.
Smart Poster Record Type Definition Technical Specification NFC ForumTM SPR 1.1 NFCForum-SmartPoster_RTD_1.0, Jul. 24, 2006.
Suh, J., "Introduction to composite electromagnetic noise absorber technology" EMC Directory & Design Guide, (2007), 4 pgs.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles, pp. 63-68.
Thamilarasu, G et al. "Intrusion detection in RFID systems" Military Communications Conference, 2008. MILCOM 2008. Piscataway, NJ, Nov. 16, 2008, pp. 1-7, ISBN: 978-1-4244-2676-8.
The "Weak Spots" in Stacked UHF RFID Tags in NFC Applications, IEEE RFID 2010; Xiaosheng Chen, Feng Lu, Terry T.Ye.
The Junction Protocol for Ad Hoc Peer-to-Peer Monile Applications; Computer Science Department Stanford University; Ben Dodson, Aemon Cannon, Te-Yuan Huang, Monica S. Lam, Apr. 2011.
The Mobile Phone as Digital SprayCan; Philip Garner, Omer Rashid, Paul Coulton, and Reuben Edwards, Proceedings of the 2006 ACM SIGCHI international conference on advances in computer entertainment technology, Article No. 12, Hollywood, California, USA. Jun. 14-16, 2006.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things and Cyber, Physical and Social Computing.
Turcu, C. (ed.), Development and Implementation of RFID Technology, In-Tech, I-Tech Education and Publishing KG, Vienna, Austria (Feb. 2009), 564 pgs.
Type 1 Tag Operation Specification, Technical Specification, Technical Specification, NFC Forum T1TOP 1.1, Apr. 13, 2011.
Type 2 Tag Operation Specification Technical Specification, T2TOP 1.1 NFC Forum May 31, 2011.
Type 3 Tag Operation Specification, Technical Specification, Technical Specification, NFC Forum, T3TOP 1.1, Jun. 28, 2011.
Valkkynen, Pasi, et al.,' Suggestions for Visualizing Physical Hyperlinks, PERMID 2006: Pervasive Mobile Interaction Devices—Mobile Devices as Pervasive User Interlaces and Interaction Devices, Dublin, Ireland, May 7, 2006, 245-254.
Varshney, L.R., et al.., "Securing Inductively-Coupled Communication", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pcific Microwave Conference (2007), 4 pgs.
Violino, Bob. A Summary of RFID Standards. RFID Standards. RFID Journal. Jan. 16, 2005. URL at http://www.rfidjournal.com/articles/view?135.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to improve RFID System Performance", IEEE Transactions on Instrumentation and Measurement, vol. 60, No. 8, (Aug. 2011), 2797-2803.
Weis, Stephen A, "Security and Privacy Aspects of Low-Cost Radio Frequency Identification Systems", Security in Pervasive Computing 2003, LNCS 2802, D. Hutter et al. (Eds.) (2004) 201-212.
Yamada, I., et al., "Secure Active RFID Tag System", Ubicomp2005 Workshops, 5pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.

* cited by examiner

RFID/NFC PANEL AND/OR ARRAY USED IN SMART SIGNAGE APPLICATIONS AND METHOD OF USING

CROSS-REFERENCE TO RELATED APPLICATIONS

The present application claims priority from U.S. Provisional Patent Application Nos. 61/299,609 filed Jan. 29, 2010, and 61/311,473 filed Mar. 8, 2010, and is related to U.S. Provisional Application Nos. 61/416,384 filed Nov. 23, 2010, and 61/423,139 filed Dec. 15, 2010, all of which are incorporated herein by reference in their entireties.

FIELD OF THE INVENTION

The present inventive subject matter relates generally to the art of graphic displays and/or signage.

BACKGROUND OF THE INVENTION

Illuminated signage and/or graphic displays are generally known. Commonly, illuminated signage will include graphic media, e.g., such as paper or polymeric film having a desired image thereon, that is illuminated from the back or the front or in some instances the side or edge. In general, backlight or backlit applications are those in which the media is illuminated from the side of the media that is opposite the side from which the media is intended to be viewed, while front-light or front-lit applications are those in which the media is illuminated from the same side in which the media is intended to be viewed. In side or edge-lit applications, the graphic media is generally mounted to a pane of glass or other suitable light guide which is illuminated from the edge or side. In turn, the pane of glass or other suitable light guide directs the light onto and/or through the graphic media.

Co-pending application Ser. No. 13/014,806 filed on the same day as the instant application discloses a smart signage concept, and in particular a graphic display and/or illuminated sign box 50. In particular, the display or sign box 50 holds or otherwise supports a graphic media 80 intended to be viewed, e.g., by the public or some other desired audience.

In the aforementioned co-pending application, two basic "smart" features have been proposed along with other features. The first basic smart feature involves the use of a security tag (e.g., an RFID device 82) or the like placed at a specific place on the graphic media 80 that interacts with an RFID reader 60 built inside the sign box 50. The reader 60 and/or a connected controller 56 authenticates the tag (and thus the graphical media 80) to make sure that the correct graphics from the correct source is installed in the sign box 50. If the reader/controller cannot detect or authenticate the tag, then the sign box 50 will not function properly, e.g., it will not turn on a light 54 to illuminate the signage. This security feature helps ensure that a brand owner feels safe letting others change graphics in their sign box. Additionally, a sign maker can also use the owner's authentication or security code to change graphics with the owner's authority.

The second smart feature disclosed in the '609 application provides the sign graphics or sign box 50 with the capability to communicate and/or otherwise interact with suitably equipped or otherwise provisioned mobile devices, e.g., such as cell phones, personal digital assistants (PDAs), etc. In particular, it was disclosed that NFC or other like short range communication technology could be used for this feature. For example, in one exemplary embodiment, the RFID device 82 could be enabled for NFC functionality. The present disclosure expands upon this interactive smart feature to further meet the demands and/or desires of sign makers, owners, operators, viewers, etc.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one exemplary embodiment, advertising system, is provided and includes a graphic media supporting frame that has an activatable light source, and an advertising graphic that has printed or imaged indicia relating to an advertising or marketing campaign. A plurality of RFID tags are provided, with each of the RFID tags including a substrate that has first and second surfaces, an antenna and a chip disposed on the first surface with the chip encoded with information relating to the advertising graphic. An activator is provided for activating and reading the chip on at least one of the plurality of RFID tags and for causing a first signal to be sent to the graphic supporting frame. The present system also includes a processor for receiving the first signal and for transmitting a second signal to the activator.

In a still further exemplary embodiment of the presently described invention, an interactive advertising system, is presented and includes an advertising graphic that is provided at a first location, the advertising graphic has indicia relating to a particular marketing theme or campaign and is supported by a frame having an illumination device. A display panel is provided and has a plurality of RFID devices positioned thereon. The display panel is at a second location distinct from the first location. An activator is used for activating and reading at least one of the plurality of RFID devices and for causing a first signal to be sent to the advertising graphic. A processor is used for receiving the first signal and for transmitting a second signal to the activator such that the activator activates the illumination device to display a portion of the advertising graphic related to the at least one of the plurality of RFID devices.

In yet a still further exemplary embodiment of the presently described invention, a method of using an interactive advertising system is described and includes the steps of initially providing an advertising graphic and then placing the advertising graphic in a supporting frame which has a light source. Next, a display panel is provided that has a plurality of RFID devices with each of the RFID devices having at least one of content or language. Then at least one of the RFID devices read to create a first signal and the first signal in order to activate the light source to illuminate at least a portion of the advertising graphic.

Other features and advantages of the present inventive subject matter will become apparent to those skilled in the art from the following detailed description. It is to be understood, however, that the detailed description of the various embodiments and specific examples, while indicating preferred and other embodiments of the present inventive subject matter, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Radio frequency identification (RFID) tags and labels (collectively referred to herein as "devices") are widely used to associate an object with an identification code or other information. RFID devices generally have a combination of antennas, and analog and/or digital electronics, which may include for example communications electronics, data memory, and control logic. For example an RFID system often includes an RFID chip in order to store information. Common uses for RFID tags include but are not limited to security locks in cars, for access control to buildings, and for tracking inventory and parcels.

RFID labels are typically pressure sensitive based and have RFID devices that are incorporated into the label (such as by placing an inlay on a label substrate) that are adhesively or otherwise applied or attached directly to objects. RFID inlays may be incorporated into a label in order to form a RFID inlay. In addition to labels, RFID devices can be provided in other suitable formats such as tags which might be hung or attached to the display such as by mechanical fasteners like VELCRO, frangible coatings or the like.

RFID devices include active tags and labels, which include a power source, and passive tags and labels, which do not. In the case of passive devices, in order to retrieve the information from the chip, a "base station" or "activator" sends an excitation signal to the RFID tag or label. The excitation signal energizes the tag or label, and the RFID circuitry transmits the stored information back to the activator. The RFID activator receives and decodes the information from the RFID tag. In general, RFID devices can retain and transmit enough information to uniquely identify individuals, packages, inventory and the like. RFID devices also can be characterized as to those to which information is written only once (although the information may be read repeatedly), and those to which information may be written during use. For example, RFID devices may store environmental data (that may be detected by an associated sensor), logistical histories, state data, etc.

RFID devices suitable for use in accordance with embodiments disclosed herein are available from Avery Dennison RFID Company of Clinton, S.C.

Commonly, signs and the like for displaying graphic media such as those described in the co-pending application can be located in places not easily accessed, e.g., such as high on a post, on a building, behind a window, behind a counter or otherwise substantially out of reach of a viewer. In such instances, the RFID device 82 or the like carried by the graphic media 80 may be further away than the effective communication range within which a viewer is able to reach. That is to say, a viewer desiring to access or otherwise communicate (e.g., via their mobile phone or other like communication device) with an RFID device 82 or the like carried by the graphic media 80 may be physically unable to place their mobile phone or other like device close enough to the RFID device 82 in order to establish effective communication or other interactions therewith. For example, NFC based technology typically works only within a limited range, e.g., a couple of centimeters or inches. Placing a mobile phone or other like device in such close proximity to the graphic media 80 carrying an RFID device 82 that a viewer wishes to access can be inconvenient at times, particularly, when the sign or display 50 holding the graphic media 80 is physically beyond the reach of the viewer such that the distance between the viewer's mobile phone or other like device and the RFID device 82 is greater than the effective range of the communication technology and/or protocol employed. In this case, carrying the RFID device 82 and/or NFC tag inside or on the graphic media 80 may not be practical.

Figure 1:
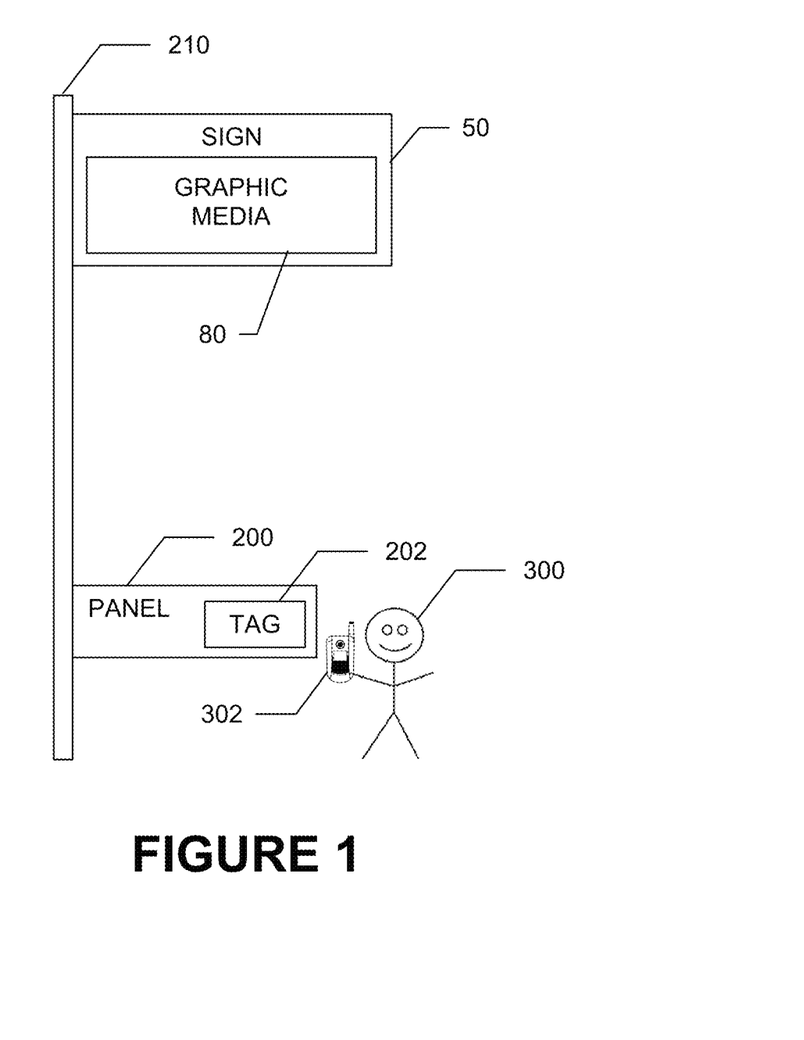
FIG. 1 depicts a schematic illustration of the advertising system of the present invention.

With reference now to FIG. 1, in cases such as the foregoing, it is proposed herein to have a separate panel 200 which is placed in a location that is easy to access by viewers or users of the signage, e.g., such as an individual 300. In an exemplary embodiment, the panel 200 includes at least one tag 202. Suitably, the tag 202 is implemented as an RFID device (similar to the RFID device 82 described in the '609 patent) or some other like communication device. For example, the tag 202 is optionally provisioned with NFC functionality or some other wireless and/or short range communication capabilities. Optionally, the tag 202 communicates via Bluetooth or other wireless personal area network (WPAN) communication protocols and/or technology. Suitably, as shown in FIG. 1, while the sign 50 displaying the graphic media 80 may be out of reach or range, the panel 200 is still easy to access. For example, while the sign 50 may be hung high over head or otherwise out of reach of the viewer 300, e.g., on a post 210, the panel 200 is placed at a lower elevation below that is easily accessible to the viewer 300. Accordingly, the viewer 300 is readily able to place their mobile phone, PDA, activator or other like communication device 302 near to or otherwise within the effective communication range of the tag 202. In this manner, assuming the viewer's device 302 is provisioned or otherwise enabled with the same communication technology and/or protocol capabilities as the tag 202 (e.g., NFC or otherwise), then the device 302 and tag 202 are able to communicate and/or otherwise interact with one another, e.g., as described in the '609 application. Suitably, the content of the tag 202, on the tag 202 or otherwise supplied to the viewer's device 302 by the tag 202 is related to the content of the graphic media 80 displayed on the sign 50. Optionally, the tag 202 provides the viewer's device 302 with an Internet or web address or other like pointer, e.g., to which a browser or the like on the device 302 is directed. The corresponding Internet site or web page accordingly contains the content that is ultimately delivered to the device 302, e.g., coupons, video or sound clips, additional advertising or promotional material, etc. Alternately, the tag 202 may provide or otherwise communicate the content directly to the viewer's device 302.

Alternately, the tag 202 included on the panel 200 can be built in or other integrally arranged thereon (e.g. molded, laminated, etc.), or it can be removable and/or replaceable, such as through the use of a removable or repositionable adhesive. Accordingly, in the later case, when the graphic media 80 is replaced on the sign 50, a new tag 202 for the corresponding content can also be replaced in or on the panel 200. Optionally, in the formed case, when the graphic media 80 is replaced on the sign 50, the content of the tag 202 can be rewritten or otherwise provisioned in situ. Alternately, the panel 200 can be removed and returned to a sign shop or the like for rewriting or other like updating of the tag 202.

Of course, even though the graphic media 80 and/or sign 50 may be installed in a place that is accessible, it may still be desirable to have the panel 200 and/or tag 202 separated by some distance therefrom. For example, in order to get a panoramic or full view of the graphic media 80, the viewer 300 may want to stand at some distance from the media 80. Accordingly, it may be desirable to have the panel 200 and/or tag 202 located at this distance so that it can be accessed while obtaining a full view of the sign 50 and/or the media 80 held thereby. In general, close proximity of the tag 202 to the media 80 may not be quite practical for all signage applications. For example, if only one tag 202 is used directly on the media 80, the users may be inconvenienced by having to get their device 302 close to the tag 202 and they may even have to move their device 302 across the media 80 to looking for the tag 202, e.g., because in some applications it may desirable to have the media content unencumbered with a message or other indicia pointing to the location of the tag 202 on the media 80.

Figure 2:
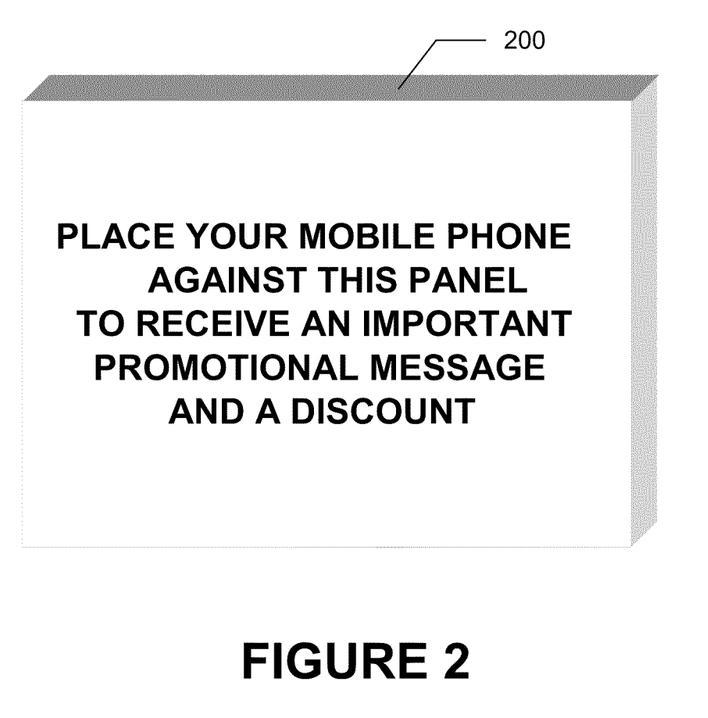
FIG. 2 shows an display panel for use in connection with the advertising system of the present invention.

Accordingly, using a separate panel 200 to hold the tag 202 allows one to readily identify the location of the tag 202 without obscuring or encumbering the content of the graphic media 80. Optionally, for example, the panel 200 may be provided with a message or pointer or other like indicia instructing or otherwise showing the viewer 300 where to place their device 302 in order to communicate or otherwise interact with the tag 202. For example, see FIG. 2.

Figure 3:
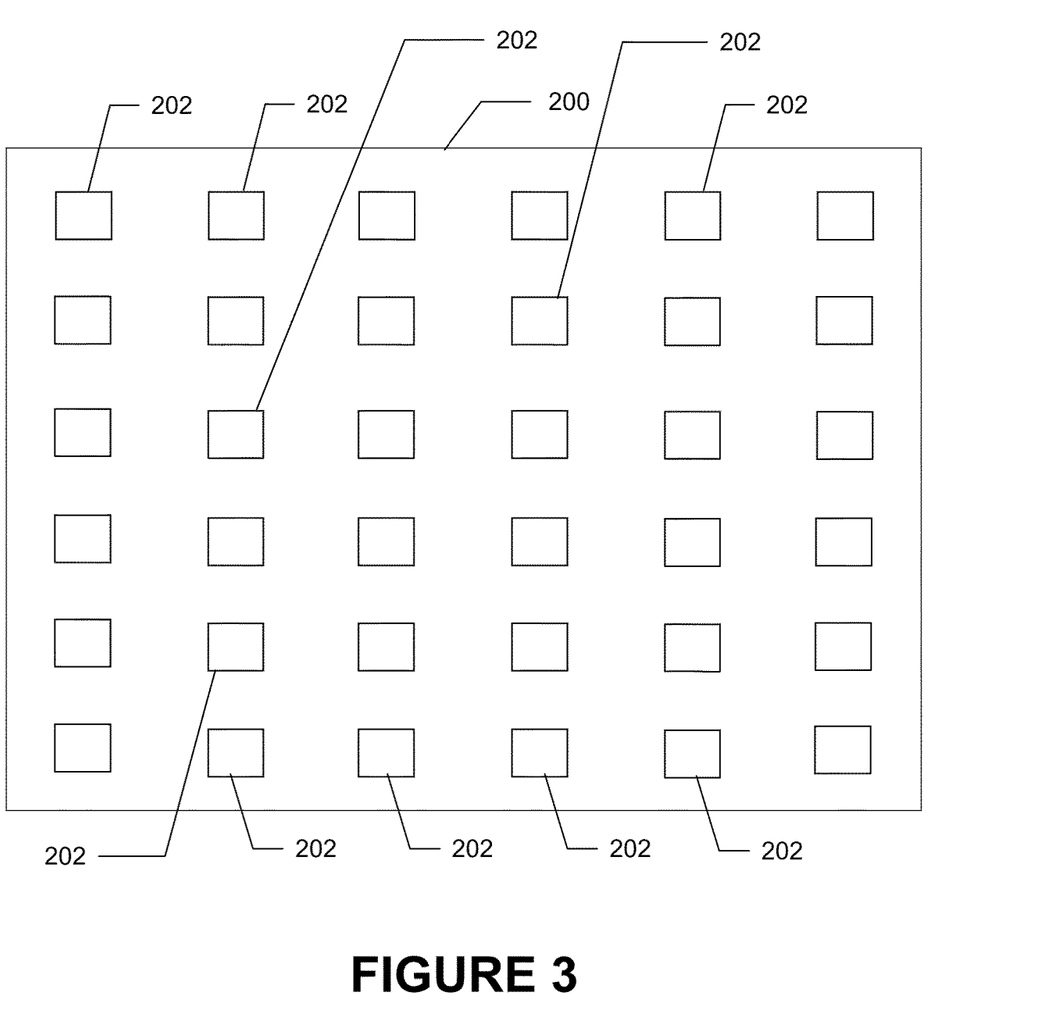
FIG. 3 provides an illustration of a display providing a plurality of display panels for use in connection with the advertising system of the present invention.

Typical, a tag 202 can only talk or otherwise communicate with one device 302 at a time, so a viewer such as the viewer 300 may become impatient if he has to wait for his or her turn (e.g., because through put for reading the media 80 on the sign 50 is too low). Accordingly, there may be an array of panels 200 provisioned for each sign 50 and/or each panel 200 may be provisioned with an array of tags 202. That is to say, for each sign 50 there may be one or more panels 200 and/or each panel 200 may be equipped with one or more tags 202. For example, as shown in FIG. 3, a large panel 200 can be use that has multiple tags 202 that are distributed in a 2 dimensional (2D) array. Suitably, the tags 202 are positioned so that they will not interfere with each other (i.e., so that they are not too close to one another). However, optionally, the tags 202 are still positioned close enough to each other so that substantially the whole surface of the panel 200 is active. Accordingly, a user may place their device 302 anywhere on the panel 200 to achieve interactive communication (i.e., via one of the tags 202). Moreover, multiple users can obtain such access at the same time by positioning their respective devices at different locations on the panel 200 and hence simultaneously achieving interactive communication via a plurality of corresponding different tags 202.

Figure 4:
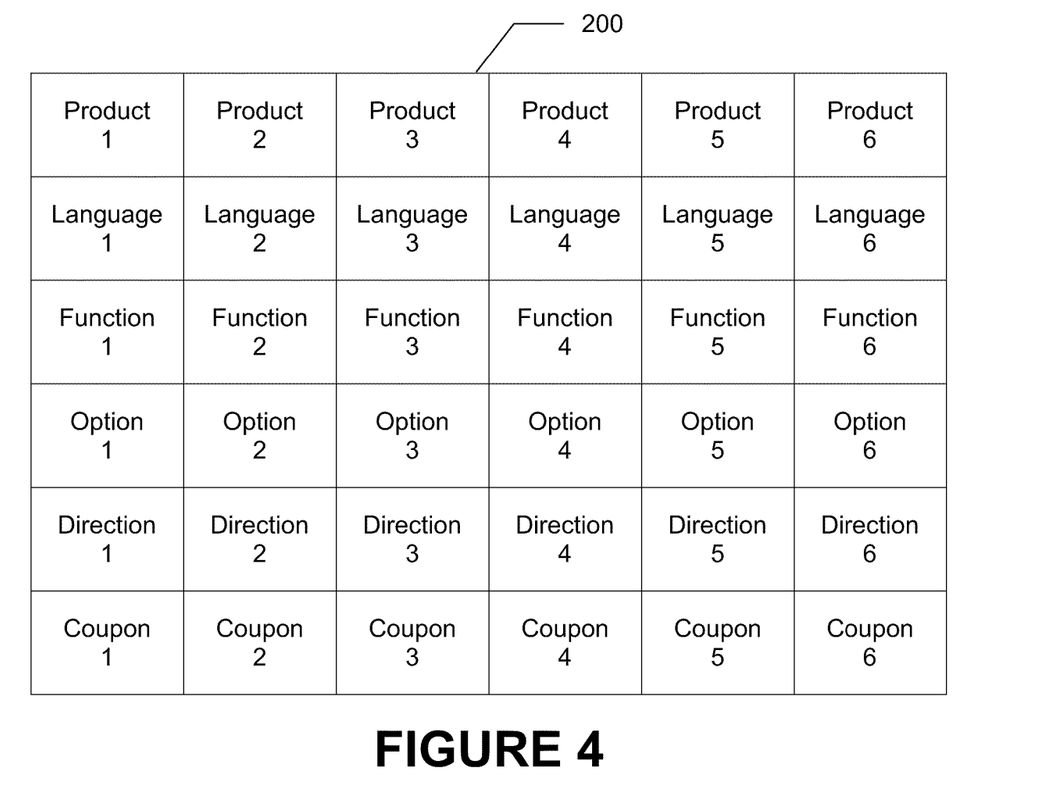
FIG. 4 illustrates a content display of the plurality of display panels provided in FIG. 3.

In one suitable embodiment, each tag 202 on a panel 200 may perform the same function or otherwise provide for the delivery of the same content to a user's device 302. Alternately, one or more of the tags 202 may perform different functions or provide for the delivery of alternate content to the user's device 302. For example, as illustrated in FIG. 4, content related to a number of different products may be provided, or the content may be in a number of different languages, or a number of different functions or options may be activated, or a number of different directions or a number of different coupons may be delivered, e.g., depending on the location where the user 300 places their device 302 onto or next to the panel 200 and accordingly which tag 202 is thereby accessed.

In one suitable embodiment, a 2D array or other arrangement of tags 202 are provided on or in a sheet of media or other like carrier that is selectively held by, affixed or otherwise secured to, e.g., a face of the panel 200. In this way, the media or carrier can be readily replaced or changed in order to update or change the tags 202 on the panel 200, e.g., when the graphic media 80 on the sign 50 is changed or updated. Optionally, the media or carrier for the tags 202 is printable or otherwise marked via any suitable printing method known in the art, e.g., on at least one side thereof, or the media or carrier can be embossed to create patterns as well as to assist the visually impaired. Accordingly, the media or carrier can be selectively printed or imaged with indicia, instructions, messages or the like that indicate the locations, content, functions, etc. of the various tags 202 underlying or otherwise corresponding to each region of the media or carrier. Optionally, the sheet or media or other like carrier of the tags 202 may simply include printing or indicia thereon as it relates to a panel 200 functioning for another graphic sign nearby (e.g., such as the sign 50 displaying the media 80); or the sheet/carrier for the tags 202 may also serve as the main or primary graphic display as well as.

While shown in FIG. 3 as a 2D rectilinear array, it is to be appreciated that optionally the tags 202 can be arranged in any geometry relative to each other. For example, they are optionally arranged in a hexagonal pattern or other suitable pattern. Again, as referenced above, the tag carrying media or the panel 200 can optionally be divided into different sections, with each section having its own unique interactive information and/or different information between different sections. Thus, users are provided choices and they can select whichever item they are interested in.

Figure 5:
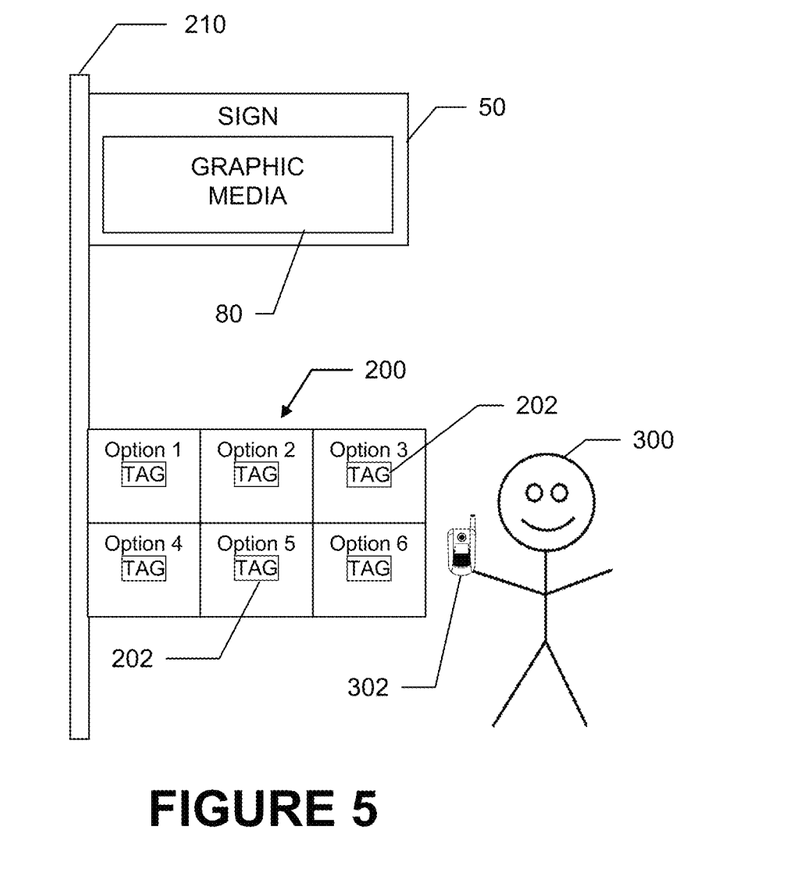
FIG. 5 shows an interactive display panel for use in connection with the advertising system of the presently described invention.

With reference now to FIG. 5, in one suitable embodiment, the viewer 300 optionally communicates or interacts with a desired tag 202 by placing their mobile device 302 at the appropriate location on or near the panel 200. Suitably, each tag 202 is associated with a different option for controlling one or more functions or operations of the sign 50. For example, the media 80 may optionally be printed or imaged at different locations with different content or in a plurality of different languages. Accordingly, the viewer 300 selects their desired content or language by appropriately positioning their mobile device 302 over or near the location on the panel 200 to access and/or communicate or otherwise interact with the corresponding tag 202. In response, the accessed tag 202 signals the sign 50 which in turn reacts to the selected option by illuminating that portion of the media 80 printed with the content or language selected. In this way, the user 300 is able to view the desired content on the sign 50 or view the media 80 in their chosen language.

In one suitable embodiment, the panel 200 is equipped with appropriate electronics and/or other hardware, software and/or firmware to detect and/or distinguish such interactions with the respective tags 202 and/or relay communications from or with the tags 202 to the sign 50. Optionally, the panel 200 may be hardwired to the sign 50 in order to communicate therewith or the panel 200 may wirelessly communicate with the sign 50. For example, the panel 200 is optionally equipped with an antenna that picks up signals to and or from the respective tags 202 and in turn identifies for the sign 50 which tag 202 is accessed and/or relays appropriate signals to the sign 50. In addition, if an antenna is provided in the panel, the antenna can be further used to provide an energy source, e.g. battery, or boost of energy to either the display or the tag in order to facilitate the exchange of information. The antenna in the panel can also capacitively couple to the tag in order to increase read range of the tag. Suitably, the information or data received from the panel 200 is optionally processed by the signs controller 56 and the sign 50 regulated or otherwise controlled accordingly.

In yet one further embodiment, optionally the sign 50 or some portion thereof is implemented as a video display or electronic billboard or the like and may optionally be provision with a speaker and/or other audio playback capabilities. In addition to visual and auditory feedback, olfactory capabilities may also be included, such that for example a fragrance retailer can have the prospective customer experience a particular scent. Accordingly, the various options presented via the tags 202 on the panel 200 may in turn trigger the sign 50 to play a corresponding video and/or audio clip, e.g., such as a movie trailer or music sample. Alternately or in addition, a user 300 may selectively interact with a given tag 202 on the panel 200 by placing their communication device 302 next to or near the desired tag 202, and accordingly, the various different tags 202 may prompt delivery of various different video and/or audio clips to the users device 302, which the user 300 can then play as desired. In one option, upon accessing a given tag 202, the video or audio content may be directly delivered to the device 302, e.g., via a Bluetooth connection, or alternately, the tag 202 may provide the viewer's device 302 with an Internet or web address or other like pointer, e.g., to which a browser or the like on the device 302 is directed. The corresponding Internet site or web page accordingly contains the content (i.e., video and/or audio clip) that is ultimately delivered to the device 302. In either case, suitably, the video or audio clips may relate to or be associated with the content displayed on the sign 50.

Optionally, the NFC tag 202 enables the user's device 302 to accept a data file at high speed (e.g., via a Bluetooth connection); so, for example, when the user 300 access the tag 202, a local Bluetooth server will push a video or audio file to the user's device 302. Accordingly, in one embodiment, the controller 56 in the sign 50 (e.g., which handles the authentication) may also optionally store the media (i.e., video and/or audio clips) and will push the selected audio and/or video clips to the target mobile device 302 when the corresponding tag 202 is read thereby. Optionally, the sign 50 or controller 56 could also include a link (e.g., via a WiFi or a wired connection) that allows easy updating of data files.

While the tags 202 herein have been referred to in terms of electronic communication devices, it is to be appreciated that in alternate embodiments, for delivering content and/or information or data to the viewer's mobile device 302, optionally the tags 202 may be implemented as bar codes or other like indicia printed or otherwise formed on the panel 200 or a sheet of media secured thereto. In such instances, the viewer's mobile device 302 is optionally equipped with a bar code read or the like with reads the tag 202 and decodes or otherwise interprets the corresponding data, e.g., which may be an Internet or web address or other like pointer, e.g., to which a browser or the like on the device 302 is directed to obtain the associated content.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate. For example, a single RFID device (such as the device 82) may optionally be provisioned with control logic or other like instructions for the operation of the sign 50, authentication data and NFC functionality. Alternately, a plurality of separate RFID or other like devices may be employed each provisioned to carry out one or more of the foregoing functions. For example, one RFID device could be provisioned with sign control logic or the like and authentication data, while a separate RFID could be provisioned to support the NFC functionality with regard to the viewers' devices 302.

There are of course a number of other applications for the present inventive subject matter. For example, the present system could be used as a replacement for the 'old' phone systems, where a user or guest would touch the hotel's tag or key which has an embedded RFID device with your mobile (and perhaps the one with the correct language) and it connects you to the hotel operator, who knows from the number you came in on what language you speak or alternatively with a number of other hotel services, such as video options through the in room monitor or graphics display device. In addition, the display provides details about the hotel, and other points of potential interest.

Another example includes illuminated highway markers, signs or the like, where a motorist would be able to gain assistance and receive additional instructions as well as status of the service vehicle by using his or her mobile phone as the activator for the RFID device in the signage. The foregoing could also be used for example in connection with large entertainment events, sporting events, and the like where a graphics display could be activated to provide the customer with additional information about the event, locations of seats, dining options and the like.

Many retail eating establishments, such as fast food outlets now facilitate the processing of customers through illuminated signage in which a customer through use of an intercom system places his or her order with the establishment. In the present example, the system through the use of a split panel, one panel would show what food selections are available, the other panel would allow the user to select and possibly pay. The activator or phone would then receive a code, which the customer would take it to the counter, to get his or her food. Alternatively, menus with the NFC stickers could be on the table in front of you and the activator used to select which dining options are desirable.

Another possible use for the present invention would be to include a pack of postcards with removable NFC stickers disposed thereon. For example a transparent holder with say a 4×5 grid of pockets could be used to display a variety of cards for distinct service or entertainment offerings. A retailer, or a do it yourself ("DIY") store, will accept a payment from a local service provider who desires to advertise a service. The retailer, then would generate a postcard, such as through an inkjet printer (or give the card to the user to print at home), and, then using a mobile phone or activator, program the NFC to include contact website and/or contact number for the service provider. The illuminated sign on display at the retailer identified above then accepts a graphic which advertises the local services.

Larger advertisers may want to send out preprinted postcards with NFC to shops on the basis that these can be used to advertise brands in unused slots. Each card has a unique ID as well as its NFC data, the larger advertiser will get 'hits' on its website which can be connected to a particular card sent to a specific retailer and a small payment can be made.

It will thus be seen according to the present invention a highly advantageous interactive advertising system and method has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. An advertising system, comprising:
   a frame provided in a first location having a light source, the frame supporting an advertising graphic, the advertising graphic having printed or imaged indicia relating to an advertising or marketing campaign;
   a separate panel provided in a second location accessible to a user, the panel having a plurality of RFID tags positioned thereon, each of the RFID tags including a substrate having first and second surfaces, an antenna and a chip disposed on the first surface with the chip encoded with information relating to the advertising graphic,
   where the antenna is further used to provide an energy source and
   where the antenna is capacitively coupled to the tag;
   an activator for activating and reading the chip on at least one of the plurality of RFID tags and for causing a first signal to be sent to the advertising graphic;
   a processor for receiving the first signal and for transmitting a second signal to the activator; and
   wherein the activator is a mobile communication device used by the user to activate and read the chip on at least one of the plurality of RFID tags thereby establishing a communication between the mobile communication device and the advertising graphic.

2. The advertising system as recited in claim 1, wherein each of the RFID tags contains different information relating to different product or service opportunities.

3. The advertising system as recited in claim 1, wherein each of the plurality of RFID tags is associated with the advertising graphic by at least one of adhering, attaching, laminating, embedding or combinations thereof.

4. The advertising system as recited in claim 1, wherein at least one of the plurality of RFID tags triggers an audio signal to be produced.

5. The advertising system as recited in claim 1, wherein at least one of the plurality of RFID tags triggers a video signal to be produced.

6. The advertising system as recited in claim 1, wherein at least one of the plurality of RFID tags contains an Internet address.

7. The advertising system as recited in claim 1, wherein the advertising graphic is provided with a plurality of visual codes selected from a group including bar codes, 2-D codes and combinations thereof.

8. The advertising system as recited in claim 1, wherein the advertising system is used in connection with eating and dining establishments.

9. The advertising system as recited in claim 1, wherein the advertising system is used in connection with highway signage.

10. The advertising system as recited in claim 1, wherein the activator activates the light source to display a portion of the advertising graphic relating to the at least one chip on the RFID device.

11. An advertising system, comprising:
   an advertising graphic provided at a first location, the advertising graphic having indicia, the indicia relating to a particular marketing theme or campaign, the advertising graphic supported by a frame having an illumination device;
   a panel, the panel having a surface and a plurality of RFID devices positioned thereon, where the RFID devices are closely positioned so that the surface of the panel is active; and the panel is at a second location distinct from the first location, the second location being accessible to a user;
   an activator for activating and reading at least one of the plurality of RFID devices and for causing a first signal to be sent to the advertising graphic;

an RFID reader built inside the frame, where the RFID reader authenticates the advertising graphic as a security feature and the illumination device does not turn on if the reader cannot authenticate the RFID device;

a processor for receiving the first signal and for transmitting a second signal to the activator; and the activator is configured to activate the illumination device to display a portion of the advertising graphic related to the at least one of the plurality of RFID devices;

wherein the activator is a mobile communication device used by the user to activate and read at least one of the plurality of RFID tags thereby establishing a communication between the mobile communication device and the advertising graphic; and where the at least one RFID tag is provisioned with NFC functionality.

12. The advertising system as recited in claim 11, wherein, each of the RFID devices are provided as either tags or labels and are removable or changeable with the advertising graphic.

13. The advertising system as recited in claim 11, wherein each of the RFID devices are used to provide at least one of content and language.

14. The advertising system as recited in claim 11, wherein the system further includes at least one of audio, olfactory and video capabilities which may be activated by the activator.

15. A method of using an advertising system, comprising the steps of:

initially providing an advertising graphic;

placing the advertising graphic in a supporting frame provided in a first location having a light source;

providing a panel having a plurality of RFID devices positioned thereon with each of the RFID devices having at least one of content or language, wherein the panel is at a second location distinct from the first location;

authenticating the advertising graphic as a security feature with an RFID reader;

positioning the panel to be accessible to a mobile communication device;

placing a mobile communication device in proximity to the panel to achieve interactive communication;

activating and reading at least one of the RFID devices with the mobile communication device;

creating a first signal with the mobile communication device;

sending the first signal to the supporting frame;

processing the first signal with a processor; and transmitting a second signal from the processor to the mobile communication device thereby establishing a communication between the mobile communication device and the advertising graphic, and where the second signal is sent to the mobile communication device such that the activator activates the light source.

16. The method of claim 15, wherein the step of activating further includes activating an audio, video or olfactory capability.

17. The advertising system as recited in claim 1, wherein the panel is divided into different sections.

18. The advertising system as recited in claim 17, wherein each section has its own unique interactive information.

19. The advertising system as recited in claim 1, wherein the plurality of RFID tags are arranged in a pattern on the advertising graphic.

20. The advertising system as recited in claim 1, wherein each of the plurality of RFID tags are removable form the advertising graphic to enable a change of information.

* * * * *